May 13, 1969     S. G. ATKINS ET AL     3,443,649
APPARATUS FOR EARTH CORING
Filed Feb. 23, 1967     Sheet 1 of 3
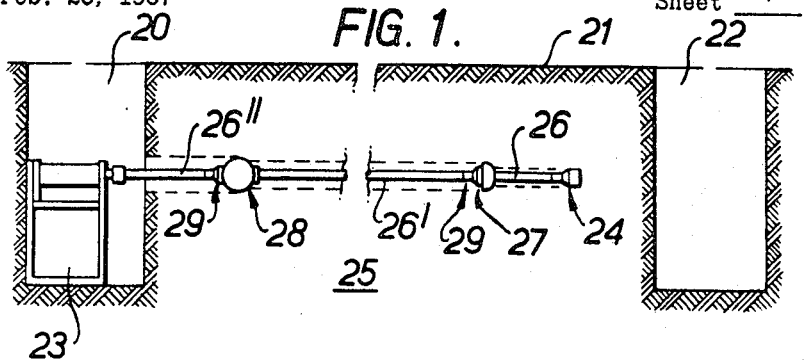
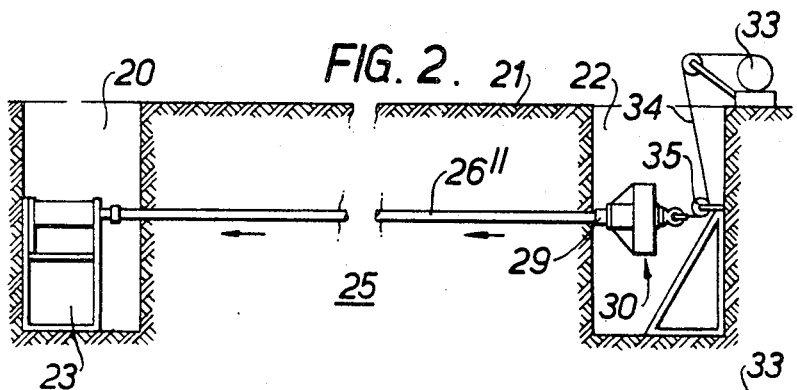
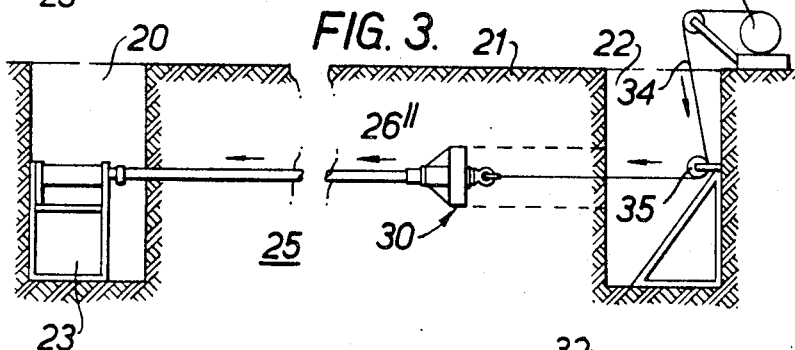
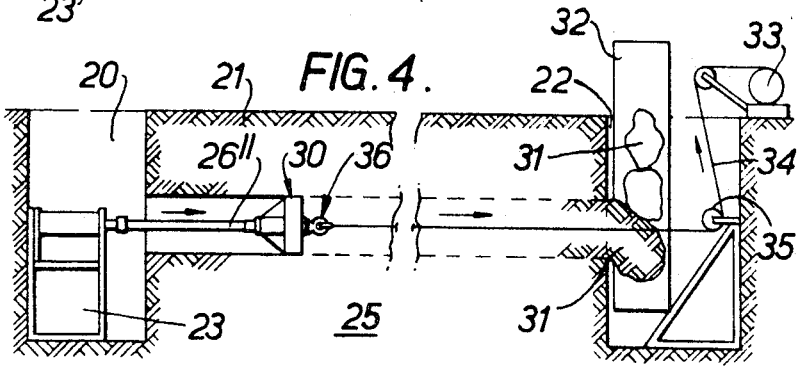
INVENTOR:
STANLEY. G. ATKINSON
STANLEY. B. BAILIE

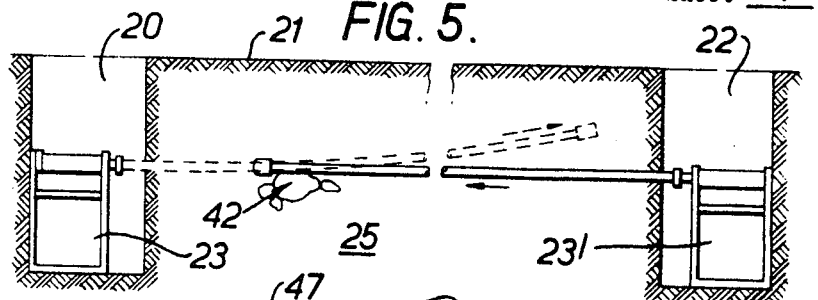
FIG. 5.
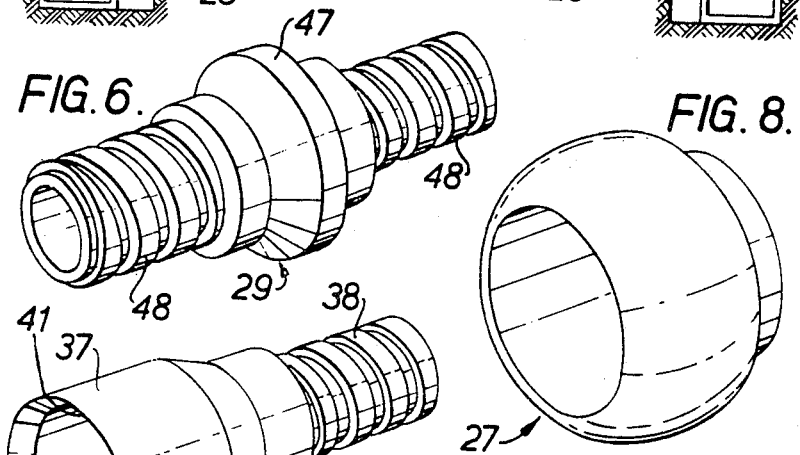
FIG. 6.
FIG. 8.
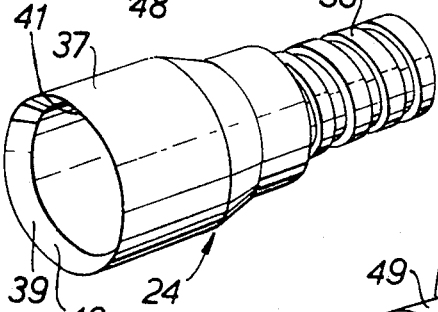
FIG. 7.
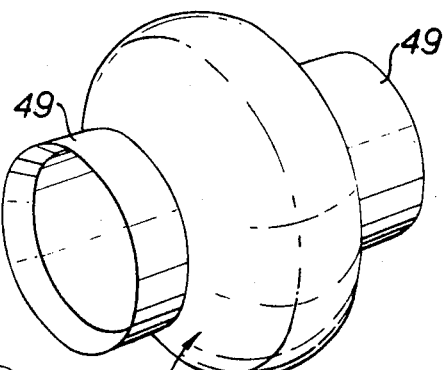
FIG. 9.
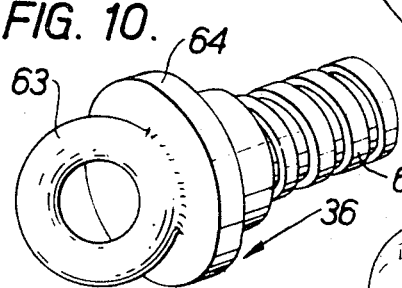
FIG. 10.
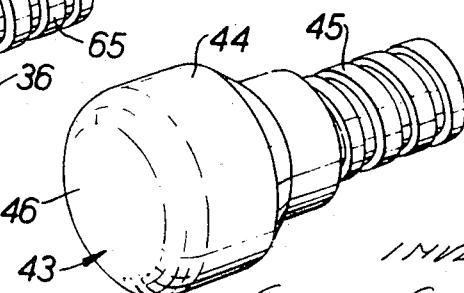
FIG. 11.

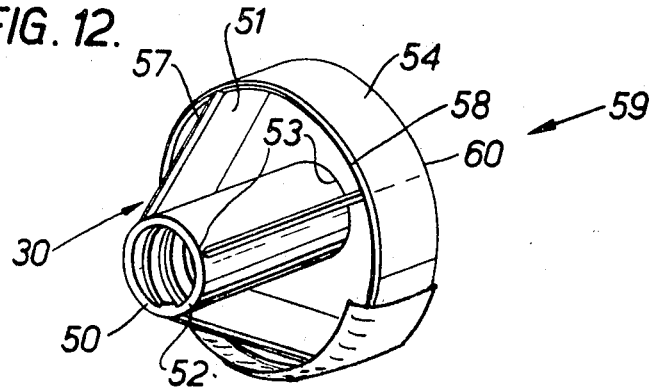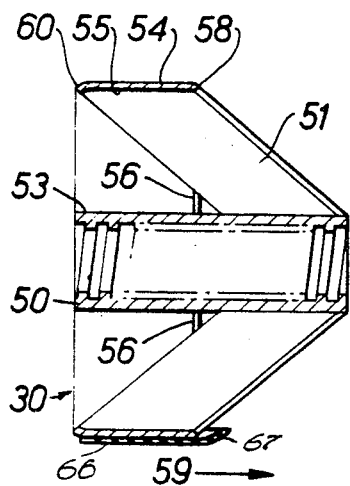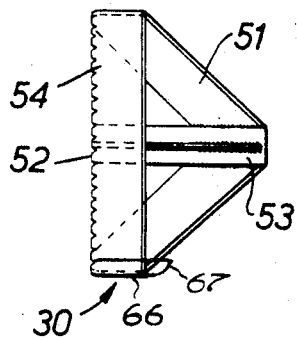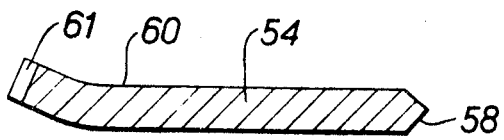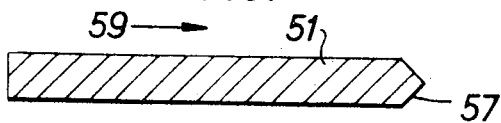

United States Patent Office 3,443,649
Patented May 13, 1969

3,443,649
APPARATUS FOR EARTH CORING
Stanley G. Atkins, 804 Stewart St., and Stanley B. Bailie, 824 Muriel St., both of Winnipeg 22, Manitoba, Canada
Filed Feb. 23, 1967, Ser. No. 617,895
Int. Cl. E01g 3/04; E21c 13/00, 19/00
U.S. Cl. 175—401                    7 Claims

ABSTRACT OF THE DISCLOSURE

The invention relates to a cutter assembly for coring through earth formations consisting of an annular cutter ring with segmenting fins secured thereto and extending inwardly, with the trailing edge of the cutter ring being inturned.

---

The invention is primarily concerned with forming a core or tunnel extending horizontally through earth formations over relatively long distances for the installation of sewer or water lines or any other services that are to be installed under ground and that require a precut channel whether it be round, square, rectangular or triangular.

While many devices are in existence for forming relatively small diameter holes or bores over relatively short distances, these devices suffer from severe disadvantages when the distance to be cored extends for example, 25 or 30 feet or more.

For relatively short distances and small diametered hole rotating augers are used. However, these require relatively large operating pits to hold the apparatus required to rotate the auger and also to provide working space for the operators, particularly in removing the soil augered by the device.

Pull or push-type cutters (so named to distinguish them from rotative types) have been used such as shown by C. C. Merrick, U.S. Patent 2,664,273, but these are only usable over relatively short distances due to the excessive power required in moving a core of earth over any distance. This is because said core normally presents considerable frictional resistance to the surrounding walls so that tremendous power is required to extrude same.

Merrick attempts to overcome this condition by compressing the core as it is formed but here again extreme amounts of power are required so that this type of apparatus is restricted to relatively small diameter apertures over relatively short lengths.

Another disadvantage of this type of cutter is the fact that when the coring or tunnelling is being done at any depth, the compressive forces of the surrounding soil have a tendency to jamb the tool and in fact, when driving a pilot hole utilizing the method described in the above patent, it is quite usual for the compressive forces to jamb the driving rods securely so that they become irremovable.

We have overcome all of these disadvantages and have provided a method and apparatus of forming cored holes of almost any diameter over extreme distances.

We are enabled to obtain these results firstly, by providing a pilot hole cutter which inherently maintains a straight line when being driven and following the pilot hole head with a pilot hole expander which compresses the surrounding earth outwardly and enlarges the hole slightly thus eliminating frictional resistance between the walls of the hole and the rods following the pilot hole head.

Under extreme conditions, more than one expander can be used in series along the length of pilot hole head rods.

Once the pilot hole has been formed, our novel cutter is then pulled rearwardly through the pilot hole thus cutting a segmented plug of soil and forming striations on the outer surface of this plug which reduces the suction between the plug and the walls of the hole thus enabling same to be extruded on the next pass of the cutter head.

The principal object and essence of our invention is therefore to provide a method and apparatus for coring or forming tunnels through relatively long earth formations with the minimum of power and at a relatively rapid rate.

Another object of the invention is to reduce frictional coefficient between the plug and the surroundings walls thus enabling same to be extruded with the minimum of power.

A yet further object of the invention is to expand the pilot hole or core thus eliminating frictional resistance between the driving pipes and the walls of the pilot hole and also preventing same from collapsing until the cutting tool can be drawn therethrough.

A still further object of our invention is to eliminate the necessity for forming operating pits every 20 or 30 feet inasmuch as our device can be utilized over relatively long distances between operating pits.

A yet further object of our invention is to provide a method and apparatus which can be used with the minimum of labor, can form cores or tunnels through soil formations rapidly and easily, is economical in construction, and simple in operation, and otherwise well suited for the purpose for which it is designed.

In summary, the invention comprises a cutter assembly for earth coring having a longitudinally extending body portion and fins extending radially outwardly to support an earth cutting ring concentric with said body portion, said earth cutting ring being sharpened on the leading edge and having the rear or trailing edge inturned.

With the foregoing in view, and such other objects, purposes or advantages as may become apparent from consideration of this disclosure and specification, the present invention consists of the inventive concept in whatsoever way the same may be embodied having regard to the particular exemplification or exemplifications of same herein, with due regard in this connection being had to the accompanying figures in which:

FIGURE 1 is a schematic view of our invention showing the pilot hole being formed and the pilot hole being expanded.

FIGURE 2 is a schematic view showing the hole cutter in position.

FIGURE 3 is a view similar to FIGURE 2 but showing the hole cutter part way through the formation.

FIGURE 4 is a schematic view showing the cutter being used to extrude the plug formed by the cutter.

FIGURE 5 is a schematic view showing how the pilot hole can be realigned if deflected due to rocks or the like.

FIGURE 6 is an isometric view of one of the couplings used between pipe sections.

FIGURE 7 is an isometric view of the pilot hole forming head.

FIGURE 8 is an isometric view of one of our pilot hole expanders.

FIGURE 9 is an isometric view of another of our pilot hole expanders.

FIGURE 10 is an isometric view of the attaching hook securable to the cutting head.

FIGURE 11 is an isometric view of the plug head utilized to correct deviant pilot holes.

FIGURE 12 is an isometric view of the cutter head assembly.

FIGURE 13 is a vertical section of FIGURE 12.

FIGURE 14 is a side elevation of FIGURE 13

FIGURE 15 is an enlarged sectional view through the cutting ring of the cutter head assembly.

FIGURE 16 is an enlarged section through one of the fins.

In the drawings like characters of reference indicate corresponding parts in the different figures.

Proceeding therefore to describe our invention, reference should first be made to FIGURES 1 to 4, inclusive, in which 20 illustrates a first pit dug downwardly from the surface 21 of the soil and 22, the second pit also formed in the soil at a distance remote from the first pit 20.

A source of power indicated schematically at 23 is placed within the first pit and this source of power is conventional. Briefly, it provides means for moving pipe lengthwise in nonrotative fashion, by means of piston and cylinder and gripping jaws.

There are many forms of this type of source of power so that details are not believed necessary in the specification.

This source of power 23 urges a pilot hole forming head 24 horizontally through the soil mass 25 between the pits 20 and 22.

The pilot hole head assembly 24 is connected to the source of power by lengths of pipe 26, 26' and 26", additional lengths being provided as the pilot hole head assembly is moved towards the second pit 22.

A pilot hole expander and wall compactor 27 is situated upon the end of pipe 26 spaced from the assembly 24 and a second pilot hole expander 28 is placed upon the pipe 26', spaced from the first expander 27.

The expanders 27 and 28 fit loosely upon the pipes and are positioned by means of rib couplings 29, details of which are hereinafter explained.

When the pilot hole head assembly 24 breaks through into the second pit 22, it is removed from the pipe 26 and also the expanders 27 and 28 and a cutter assembly collectively designated 30 is secured to the end of the pipe 26 as shown in FIGURE 2.

This cutter assembly is then pulled in a non-rotative manner from pit 22 to pit 20 by means of the source of power 23 thus forming a segmented core due to the construction of the cutter assembly, this process being shown in FIGURE 3.

Once the cutter assembly has been pulled clear through to the first pit 20, the action of the source of power 23 is reversed and the cutter assembly is moved or pushed towards pit 22 thus extruding the plug of soil 31 into the second pit 22 whereupon it may be removed manually or, alternatively, by means of a conveyor collectively designated 32 and shown schematically in FIGURE 4.

It is desirable but not necessary to provide an additional source of power in pit 22 taking the form of a winch 33 and capable 34 passing over cable sheave 35 and being secured to the cutter assembly by means of the hook 36 secured to the cutter assembly.

Once the initial cut has been made, the diameter of the bore of the hole may be increased by moving successively larger cutter assemblies back and forth between the pits 22 and 20.

In detail, the pilot hole head assembly 24 is shown in FIGURE 7. It comprises a substantially hollow cylindrical body 37 having a reduced externally screw threaded attaching end 38 formed therewith, said end being adapted to be screw-threadably secured internally to the pipe 26.

The leading edge or end 39 of the portion 37 is inwardly chamfered as at 40 thus providing a cutting edge 41 and also acting as a self-guiding means as it is being driven through the soil. This is because of the inwardly facing chamber 40 tending to maintain the head on the original line of thrust.

However, occasionally, the pilot hole assembly is deflected from the line of thrust as shown in FIGURE 5 due to rocks 42 of the like under which circumstances, the original line of thrust has to be found.

Under these circumstances, we provide a further source of power 23' in the second pit 22 and drive the pilot hole from this pit 22 towards the pit 20. Under these circumstances, we use a corrector head collectively designed 43 and shown in detail in FIGURE 11.

This comprises a cylindrical body 44 having a reduced diameter externally screw-threaded end 45 whereby the device may be attached to the end of pipe 26 in place of the pilot hole head 24.

The front face 46 of this plug head is substantially hemispherical and tends to follow the path of least resistance so that we have found that when the corrector plug is driven towards the partially formed pilot hole, it tends to seek this pilot hole as soon as it is adjacent thereto.

The pipe 26 is approximately 10 feet in length and is joined to the next pipe section 26' by means of a flanged coupling shown in detail in FIGURE 6 and indicated by the reference character 29.

It consists of a central flange 47 having externally screw threaded reduced diameter coupling portion 48 formed upon either side thereof as clearly indicated.

The ends of the pipe sections 26 and 26' engage these screw threaded portions thus presenting an aligned section with the flange 47 extending beyond the diameter of the outside of the pipe.

The first expander 27 is substantially spherical in configuration as shown in FIGURE 8 and is centrally apertured. This expander is slipped over the pipe 26 and engages the flange 47 which prevents rearward displacement of the expander and locates it in the desired position along the pipe length.

The transverse diameter of the expander 27 is greater than the transverse diameter of the pilot hole head assembly 24 so that as it is drawn through the pilot hole, it enlarges the pilot hole slightly and compresses the soil outwardly therefrom thus compacting the walls of the pilot hole.

Under certain circumstances a second expander 28 is required and this is shown on detail in FIGURE 9.

Once again the pipe length 26' is joined to the pipe length 26" by means of the coupling 29 and the second expander is also substantially spherical in configuration with collars 49 being formed on the end thereof, said collars and expander being drilled clear through so that the expander slides freely on the pipe 26' but is restricted from the further rearward movement by means of the flange 47 of the coupler 29.

The transverse diameter of the expander 28 is slightly greater than the transverse diameter of the expander 27 thus giving additional compression to the soil surrounding the pilot hole.

These expanders not only eliminate frictional contact of the pipes with the wall of the pilot hole but also prevent the pilot hole from collapsing until the cutter assembly 30 can be drawn therethrough.

As hereinbefore described, once the pilot hole has been formed, the pilot hole head 24 and the expanders 27 and 28 are removed within the second pit 22 and the cutter assembly collectively designated 30 is screw threadably engaged upon the coupler 29 remaining upon the pipe length.

The cutter assembly is shown in detail in FIGURES 12 to 16 inclusive.

It comprises a hollow cylindrical body portion 50 internally screw threaded at both ends and having a plurality of radially extending fins 51 secured adjacent the leading end 53 of the body portion and are surrounded by a It is preferred that four such fins are provided situated equidistantly around the body portion 50 but, of course, any number can be utilized depending upon circumstances.

These fins incline outwardly towards the other or trailing end 53 of the body portion and are surrounded by a cutter ring 54 which is welded to the ends 55 of the fins 51, all of which is clearly shown in FIGURES 12, 13 and 14.

If the cutter assembly is of relatively large diameter stiffeners 56 may be incorporated between the fins 51 and the body portion 50.

The leading edges 57 of the fins are edge sharpened as shown in FIGURE 16 and the leading edge 58 of the cutter ring 54 is also edge sharpened as shown in FIGURE 15, it being understood that when the cutter is in cutting operation, it travels in the direction of arrow 59.

The portion of said cutter ring adjacent the trailing edge 60 and said trailing edge 60 of the cutter ring 54 is turned inwardly or angulated inwardly towards the body portion as clearly shown in FIGURES 13, 14 and 15, the angle made between the turned in portion 60 and the main body of the cutter being obtuse.

V-shaped notches 61 are formed around the perimeter of the inturned portion 60 and these notches form longitudinal striations upon the surface of the core formed by the operation of the cutter thus relieving suction between the core and the surrounding walls.

As the cutter assembly is pulled through from the second pit 22 towards the first pit 20, as shown in FIGURE 3, the diagonally situated fins cut into the soil surrounding the pilot hole and in advance of the leading edge 58 of the cutter ring.

The cutter ring forms the cylindrical plug which is in four segments as it is formed due to the fact that the fins have already passed through the soil forming the plug.

The inturned trailing edge of the cutter ring scrapes along the outside surface of the plug and the V-shaped notches 61 form striations thereon.

When the operation of the cutter assembly is reversed as shown in FIGURE 4, the inturned trailing edge 60 of the cutter assembly becomes the leading edge and digs into the plug and extrudes same into pit 22, the greater the pressure, the greater the wedging effect of the cutter assembly upon the end of the plug so that the plug is prevented from breaking up at this point and the cutter assembly acts as a solid ram to extrude the plug as shown in FIGURE 4.

The aforementioned striations formed upon the surface of the plug reduce the frictional coefficient between the plug and the wall of the hole thus eliminating the need of excessive power.

If it is desired to use the winch assembly 33 to facilitate the extruding of the plug, then the hook assembly 36 shown in detail in FIGURE 10 is secured to the trailing end 53 of the body portion 50.

This hook comprises a closed eye 63 secured to a cylindrical plate 64 to which is attached an externally screw-threaded bolt portion 65 adapted to engage within the screw threaded end 53 of the body portion 50.

This permits the end of the cable 34 to be secured to the cutter assembly and to supply pulling power thereto.

If it is desired that large diameter cores be provided, then once the cutter assembly has been operated, it is replaced with a larger cutter assembly and the process repeated and we have found it possible to form cores or tunnels of as large as 48 inches in diameter by means of this method and apparatus.

However, it will be appreciated that when relatively large diameter cutters are being utilized, there is a tendency of the cutter to dig in and perhaps gouge the bottom portion of the hole being formed.

We have prevented this by providing means to support the cutter while it is being pulled through from one pit to the other, said means taking the form of a cutter ring supporting plate 66 curved to conform to the curvature of the cutter ring 54 and being secured thereto as shown in FIGURE 14.

The length of this plate is longer than the length of the cutter ring and the leading edge 67 of the plate is upturned as shown so that a curved ski is provided to support the cutter ring upon the lower arc of the hole being formed.

Various modifications can be made within the scope of the inventive concept disclosed.

What is claimed as our invention is:

1. A cutter assembly for coring through earth formations comprising in combination a longitudinal extending body portion, a plurality of earth plug segmenting fins secured around said body portion and extending radially outwardly therefrom, said fins extending diagonally outwardly from one end of said body portions toward the other end thereof, and an earth cutting ring secured to the outer ends of said fins, concentrically with said body portion, said cutter ring being edge sharpened on the leading edge thereof, the trailing edge of said cutter ring being inturned.

2. The assembly according to claim 1 which includes plug surface striation forming means on said inturned trailing dege.

3. The assembly according to claim 2 in which said plug surface striation forming means comprises a plurality of V-shaped notches formed around the periphery of said inturned trailing edge.

4. The assembly according to claim 1 which includes means to support said cutter to maintain said cutter in alignment with the desired direction of travel, said last mentioned means comprising an earth cutting ring supporting plate secured to said earth cutting ring on the outer surface thereof and at the lowermost side of said earth cutting ring when in the cutting position, the length of said plate being greater than the length of said earth cutting ring, at least the leading edge of said plate being inturned.

5. The assembly according to claim 1 which includes means to support said cutter to maintain said cutter in alignment with the desired direction of travel, said last mentioned means comprising an earth cutting ring supporting plate secured to said earth cutting ring on the outer surface thereof and at the lowermost side of said earth cutting ring when in the cutting position, the length of said plate being greater than the length of said earth cutting ring, at least the leading edge of said plate being upturned.

6. The assembly according to claim 2 which includes means to support said cutter to maintain said cutter in alignment with the desired direction of travel, said last mentioned means comprising an earth cutting ring support plate secured to said earth cutting ring on the outer surface thereof and at the lowermost side of said earth cutting ring when in the cutting position, the length of said plate being greater than the length of said earth cutting ring, at least the leading edge of said plate being upturned.

7. The assembly according to claim 3 which includes means to support said cutter to maintain said cutter in alignment with the desired direction of travel, said last mentioned means comprising an earth cutting ring supporting plate secured to said earth cutting ring on the outer surface thereof and at the lowermost side of said earth cutting ring when in the cutting position, the length of said plate being greater than the length of said earth cutting ring, at least the leading edge of said plate being upturned.

References Cited

UNITED STATES PATENTS

| 1,445,289 | 2/1923 | Bron | 175—406 |
| 2,600,125 | 6/1952 | Natland et al. | 175—44 |
| 2,675,213 | 4/1954 | Poole et al. | 175—62 X |
| 2,776,111 | 1/1957 | Vance | 175—325 |
| 2,837,324 | 6/1958 | Aschacker | 175—53 |
| 2,843,362 | 7/1958 | Degen | 175—385 X |
| 2,903,252 | 9/1959 | Ebeling | 175—53 X |

CHARLES E. O'CONNELL, Primary Examiner.

RICHARD E. FAVREAU, Assistant Examiner.

U.S. Cl. X.R.

175—62